United States Patent
Kim

(10) Patent No.: US 8,259,397 B2
(45) Date of Patent: Sep. 4, 2012

(54) WIDE ANGLE ZOOM LENS

(75) Inventor: Chang-han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 12/628,387

(22) Filed: Dec. 1, 2009

(65) Prior Publication Data

US 2010/0134899 A1   Jun. 3, 2010

(30) Foreign Application Priority Data

Dec. 2, 2008   (KR) .................. 10-2008-0121275

(51) Int. Cl.
*G02B 15/14* (2006.01)
(52) U.S. Cl. ........................... 359/689; 359/676
(58) Field of Classification Search ............. 359/676, 359/682, 686, 689
See application file for complete search history.

(56) References Cited

U.S. PATENT DOCUMENTS

| 6,985,300 | B2 * | 1/2006 | Sato ............................. | 359/680 |
| 7,952,811 | B2 * | 5/2011 | Kanai et al. ................... | 359/682 |

FOREIGN PATENT DOCUMENTS

| JP | 2006-227040 A | 8/2006 |
| JP | 2007-212636 A | 8/2007 |
| JP | 2007-333799 A | 12/2007 |
| JP | 2008-070519 A | 3/2008 |

* cited by examiner

*Primary Examiner* — Darryl J Collins
(74) *Attorney, Agent, or Firm* — Drinker Biddle & Reath LLP

(57) ABSTRACT

A wide angle zoom lens system in a three lens group N-P-P configuration wherein the first lens group, the second lens group, and the third lens group are arranged in an order from an object side to an image side, and wherein, when variable power operation is performed from a wide angle to a telephoto position, the distance between the first lens group and the second lens group is reduced, and the second lens group is moved toward the object side, and the distance between the second lens group and the third lens group is increased, and wherein the zoom lens has a large view angle at the wide angle position.

21 Claims, 6 Drawing Sheets

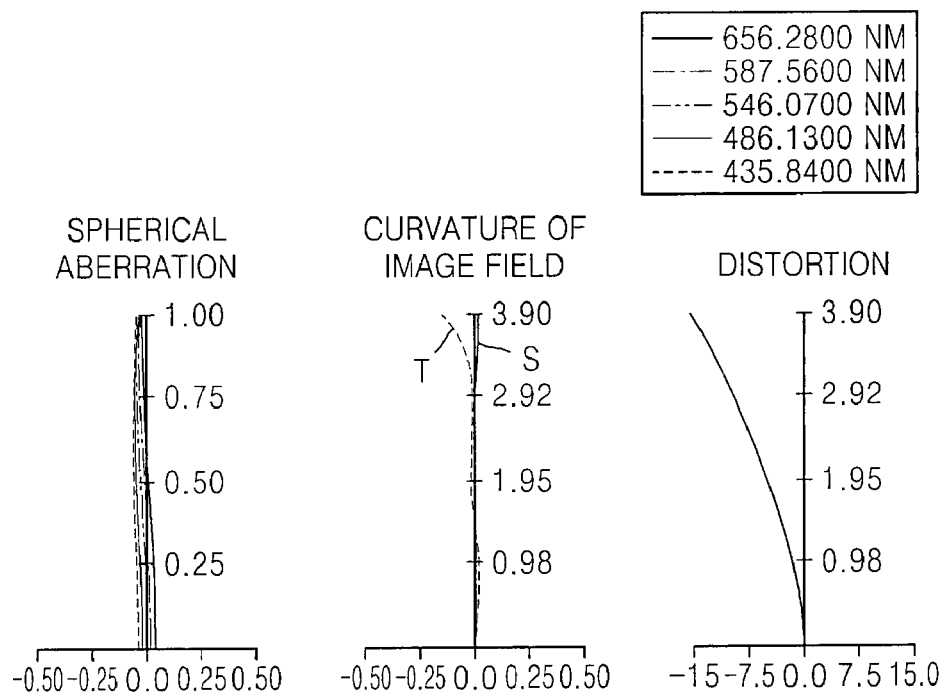
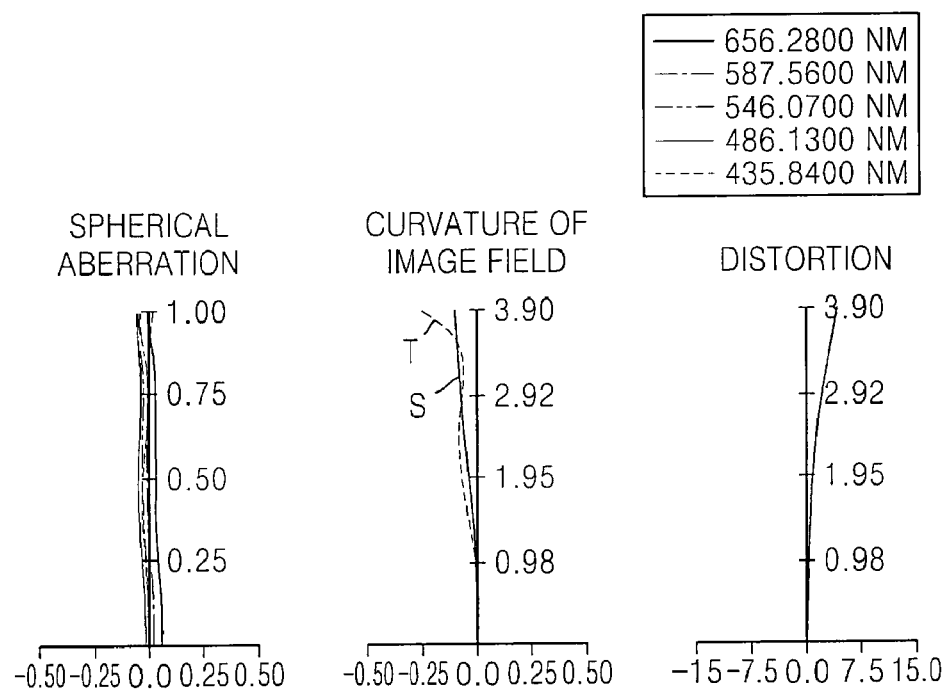

WIDE ANGLE ZOOM LENS

CROSS-REFERENCE TO RELATED PATENT APPLICATIONS

This application claims the benefit of Korean Patent Application No. 10-2008-0121275, filed on Dec. 2, 2008, in the Korean Intellectual Property Office, the disclosure of which incorporated herein in its entirety by reference.

BACKGROUND OF THE INVENTION

1. Field of the Invention

The present invention relates to a zoom lens which has a small size, a high magnification, and a super wide angle.

2. Description of the Related Art

Recently, digital cameras or video cameras including an image sensor, such as a charge coupled device (CCD) or complementary metal oxide semiconductor (CMOS), are widely used. In particular, the demand for camera modules having mega pixel resolution have increased, and cameras with resolution approaching 100 million pixels and excellent image quality are emerging. Imaging optical devices such as digital cameras using a CCD or CMOS or mobile phone cameras are designed to be small in size and light weight and low cost. Furthermore, there is an increasing demand for a camera capable of wide angle shots so that a user can photograph a subject at a wider angle.

In order to realize super wide angle or high magnification, aberration of an optical system should be corrected by using a plurality of lens groups or a large number of lenses. In such cases, the size of a lens holder increases, and it is not easy to miniaturize the whole lens system. In addition, as the number of lenses increases, performance of the lens system may be degraded due to a deviation in assembling of the lenses.

SUMMARY OF THE INVENTION

The present invention provides a zoom lens which has a small size, a high magnification and a super wide angle.

According to an aspect of the present invention, there is provided a wide angle zoom lens including a first lens group having a negative refractive power, a second lens group having a positive refractive power, and a third lens group having a positive refractive power, wherein the first lens group, the second lens group, and the third lens group are arranged in an order from an object side to an image side, and wherein, during zooming from a wide angle position to a telephoto position, the distance between the first lens group and the second lens group is reduced, and the second lens group is moved toward the object side, and the distance between the second lens group and the third lens group is increased, and wherein the second lens group includes four lenses having, respectively, positive, positive, negative and positive refractive power, and the wide angle zoom lens satisfies the following expression:

$$86° \leq wfov \leq 110°$$

where wfov is the viewing angle at the wide angle position.

According to another aspect of the present invention, there is provided a wide angle zoom lens including a first lens group having a negative refractive power, a second lens group having a positive refractive power, and a third lens group having a positive refractive power, wherein the first lens group, the second lens group, and the third lens group are arranged in an order from an object side to an image side, and wherein, during zooming from a wide angle position to a telephoto position, the distance between the first lens group and the second lens group is reduced, and the second lens group is moved toward the object side, and the distance between the second lens group and the third lens group is increased, and wherein the first lens group includes two lenses, and the wide angle zoom lens satisfies the following expression:

$$86° \leq wfov \leq 110°$$

where wfov is the view angle at the wide angle position.

The zoom lens may satisfy the following expression:

$$ft/fw > 4$$

where ft is the focal length at the telephoto position and fw is the focal length at a wide angle end.

The first lens group may include at least one positive lens and may satisfy the following expression:

$$nG2 > 1.9$$

where nG2 is the refractive index of the positive lens disposed closest to the image side of the first lens group.

The third lens group may perform focusing according to a change in a distance of an object.

The third lens group may include a single lens.

The second lens group may include a triple cemented lens.

The triple cemented lens may satisfy the following expression:

$$nC2max > 1.9$$

where nC2max is the maximum refractive index of a lens included in the triple cemented lens.

The triple cemented lens may satisfy the following expression:

$$vC2max > 80$$

where vC2max is the maximum Abbe number of the lens included in the triple cemented lens.

The second lens group may include at least one aspherical surface and one or more cemented lenses.

The zoom lens may satisfy the following expression at the telephoto position:

$$15 > Dt12 > 0.5 \text{ (mm)}$$

where Dt12 is the distance between the first lens group and the second lens group at the telephoto position.

The zoom lens may satisfy the following expression at the wide angle position:

$$30 > Dw12 > 10 \text{ (mm)}$$

where Dw12 is the distance between the first lens group and the second lens group at the wide angle position.

The zoom lens may satisfy the following expression:

$$25 > L2 > 10 \text{ (mm)}$$

where L2 is the maximum amount of movement of the second lens group.

The second lens group may move perpendicularly to an optical axis, thereby correcting shake of an image plane due to hand shake during photographing.

The zoom lens can correct optical distortion by digital correction, which results in correction of distortion that occurs due to super wide angle. An aperture stop may be disposed closest to the image side of the second lens group.

BRIEF DESCRIPTION OF THE DRAWINGS

The above and other aspects of the present invention will become more is apparent from the following detailed description of exemplary embodiments thereof with reference to the attached drawings in which:

FIGS. 2A and 2B are graphs showing aberration at, respectively, the wide angle position and at the telephoto position, of the zoom lens illustrated in FIG. 1, according to an embodiment of the present invention;

DETAILED DESCRIPTION OF THE INVENTION

The present invention will now be described in detail by explaining exemplary embodiments of the invention with reference to the attached drawings.

Figure 1:
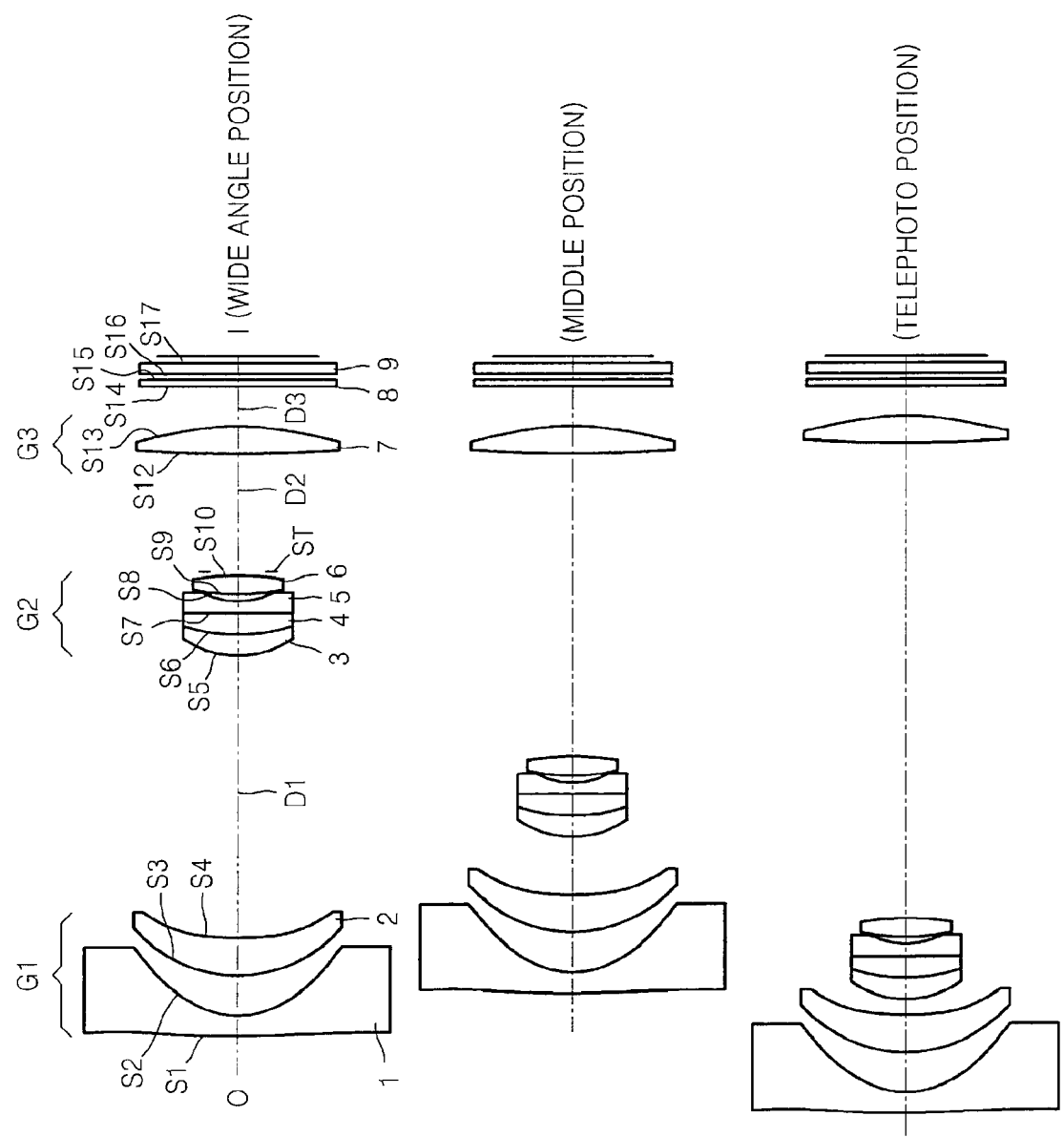
FIG. 1 is a view showing a structural arrangement of a zoom lens according to an embodiment of the present invention.
Figure 3A:
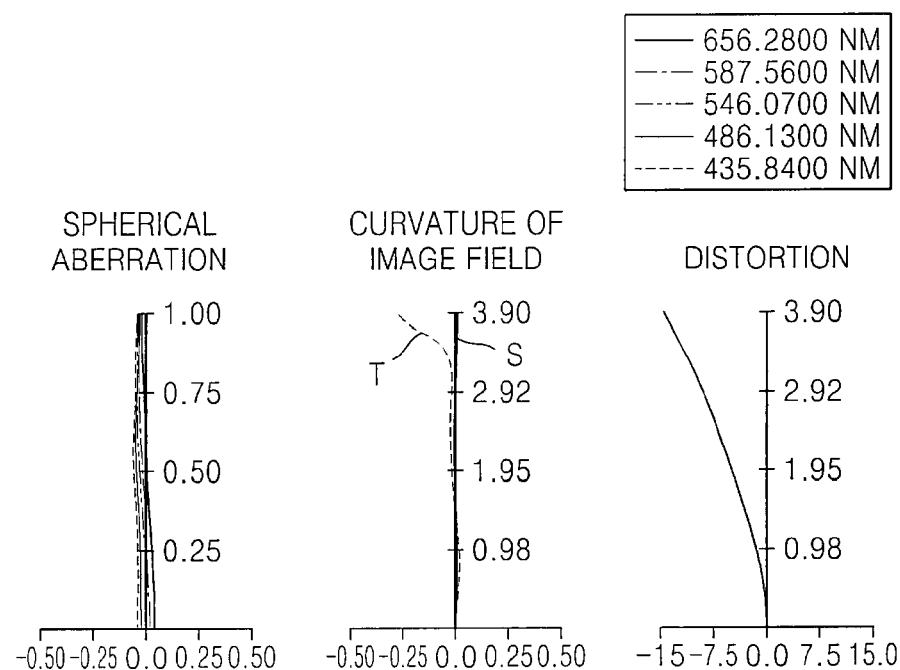
FIGS. 3A and 3B are graphs showing aberration at, respectively, the wide angle position and at the telephoto position, of the zoom lens illustrated in FIG. 1, according to another embodiment of the present invention.
Figure 3B:
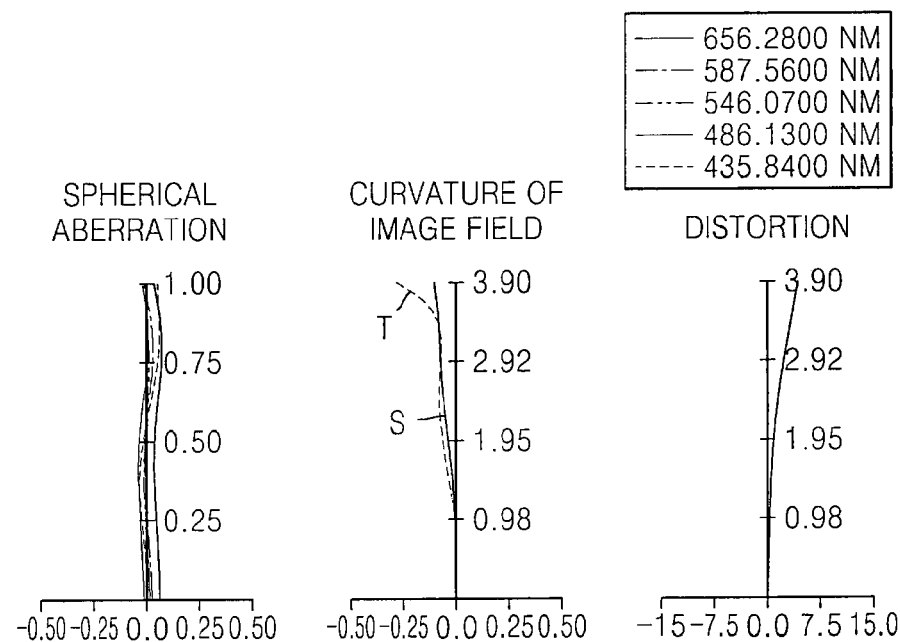
Figure 4A:
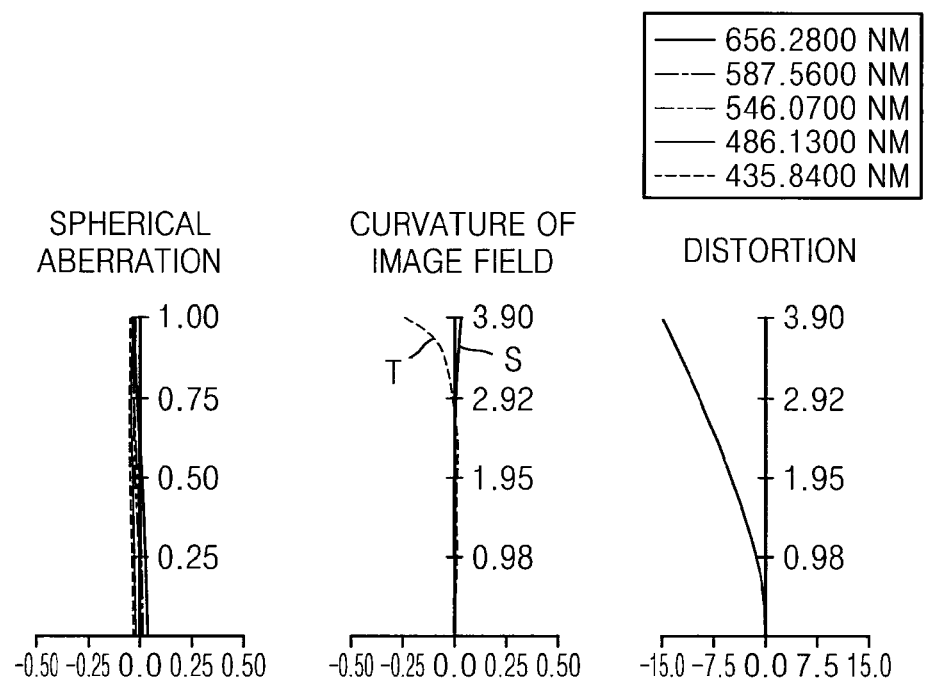
FIGS. 4A and 4B are graphs showing aberration at, respectively, the wide angle position and at the telephoto position, of the zoom lens illustrated in FIG. 1, according to another embodiment of the present invention.
Figure 4B:
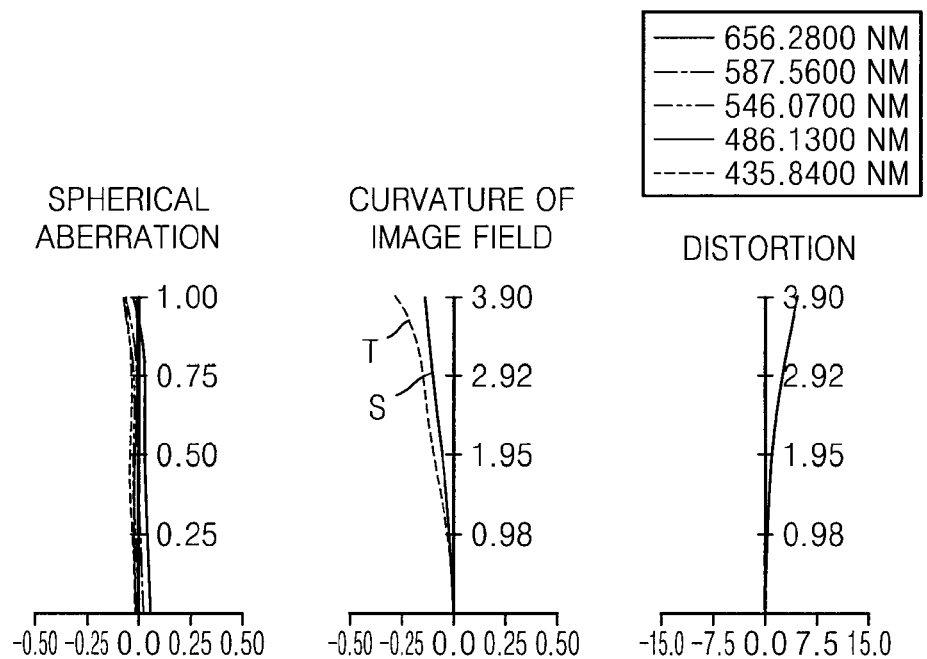
Figure 5A:
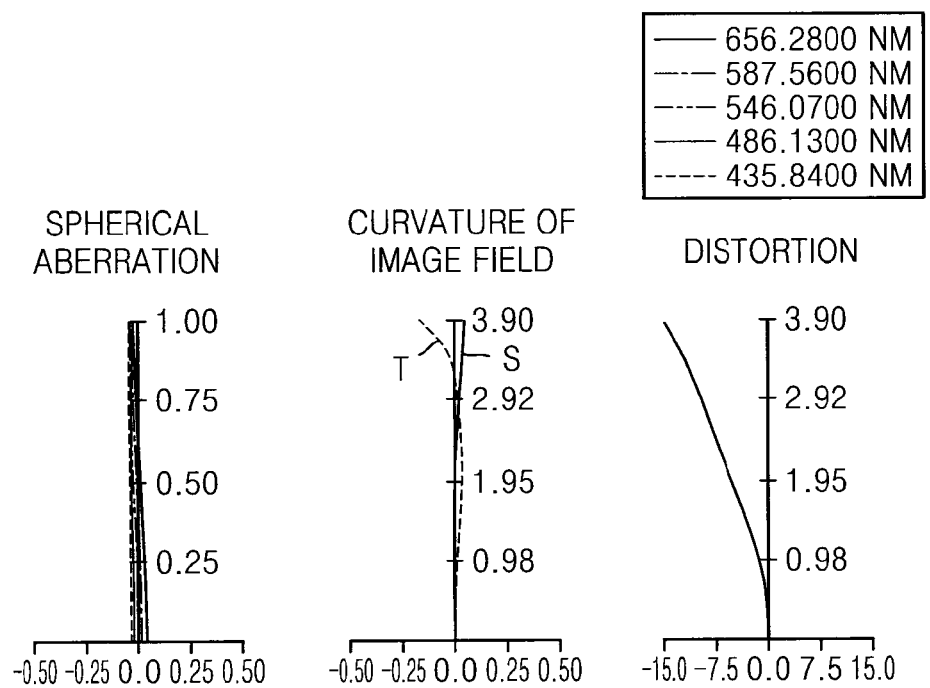
FIGS. 5A and 5B are graphs showing aberration at, respectively, the wide angle position and at the telephoto position, of the zoom lens illustrated in FIG. 1, according to another embodiment of the present invention.
Figure 5B:
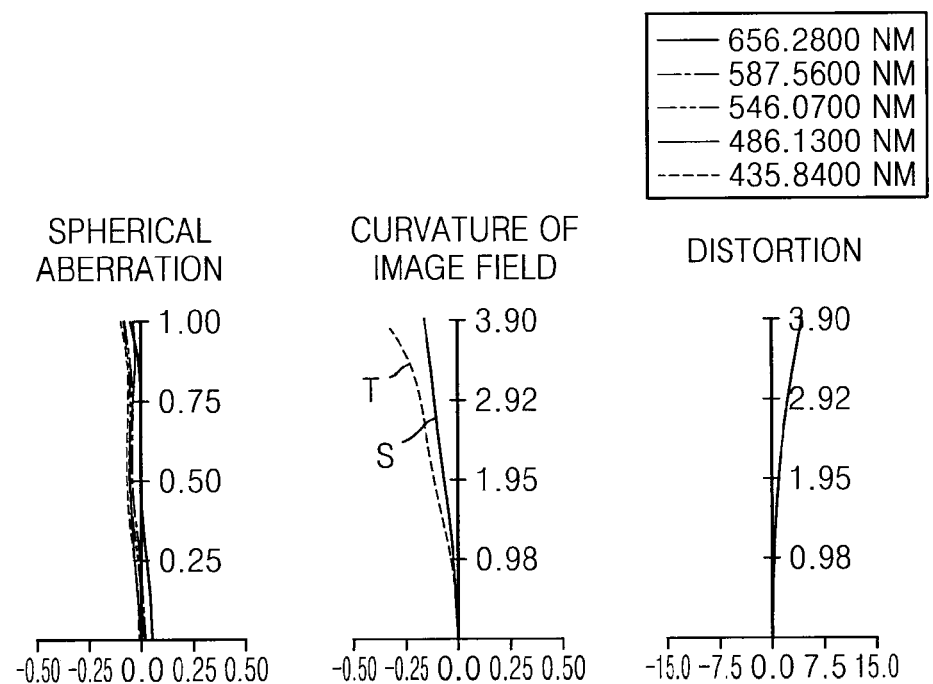
Figure 6A:
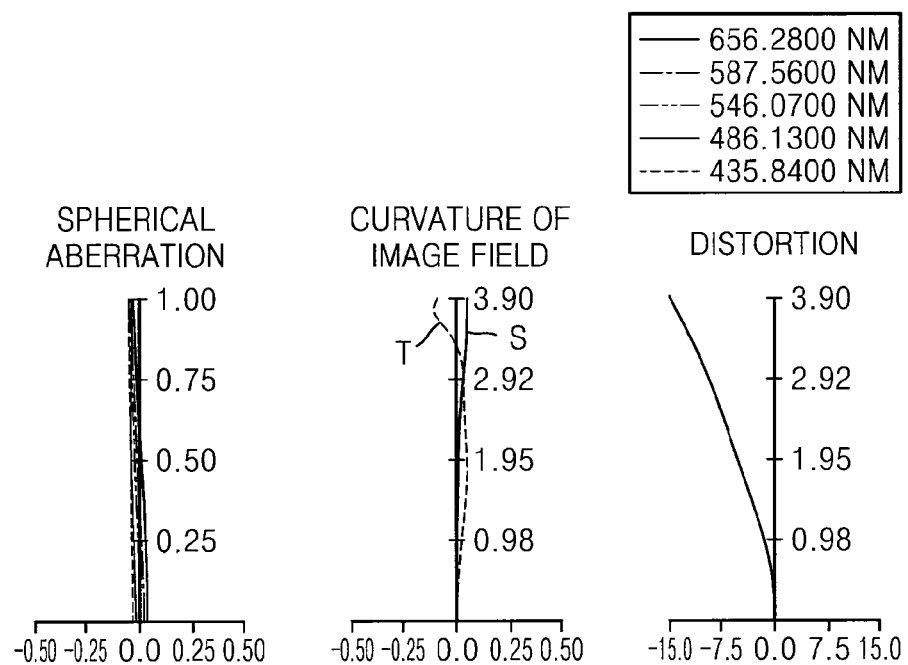
FIGS. 6A and 6B are graphs showing aberration at, respectively, the wide angle position and at the telephoto position, of the zoom lens illustrated in FIG. 1, according to another embodiment of the present invention.
Figure 6B:
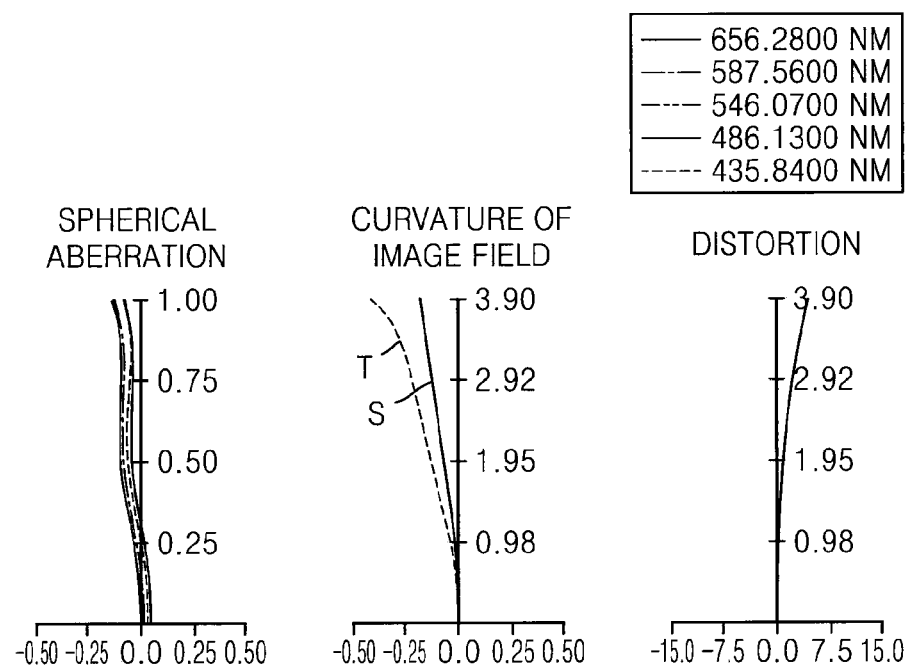

FIG. 1 is a view showing a structural arrangement of a zoom lens according to an embodiment of the present invention. Referring to FIG. 1, the zoom lens according to the current embodiment includes a first lens group G1 having a negative refractive power, a second lens group G2 having a positive refractive power, and a third lens group G3 having a positive refractive power, which are arranged in the order from an object side O to an image side I. When magnification varies from the wide angle position to the telephoto position, the distance between the first lens group G1 and the second lens group G2 reduces, and the second lens group G2 moves towards the object side O, and the distance between the second lens group G2 and the third lens group G3 increases. In the zoom lens according to the current embodiment, all of the first through third lens groups G1, G2, and G3 move relative to one another during zooming, and focusing is performed by the third lens group G3 by adjusting the position of the third lens group G3 with respect to the image plane. In the current embodiment, high magnification and super wide angle is realized, while the size of the lens holder is reduced by using three lens groups and by using a relatively small number of lenses.

The zoom lens according to the current embodiment has a view angle according to the following inequality 1:

$$86° \leq wfov \leq 110°$$ (1)

where wfov is the viewing angle at the wide angle position.

The first lens group G1 may include two lenses, for example, including at least one positive lens. For example, the first lens group G1 may include from the object side O, a first lens 1 having a negative refractive power and a second lens 2 having a positive refractive power. The first lens group G1 includes a lens having a large refractive index so as to realize super wide angle, thereby correcting distortion due to super wide angle. A positive lens disposed closest to the image side I of the first lens group G1, i.e., the second lens 2, may have a refractive index according to the following inequality 2:

$$nG2 > 1.9$$ (2)

where nG2 is the refractive index of the positive lens (the second lens 2) disposed closest to the image side I of the first lens group G1. According to this arrangement, distortion due to super wide angle may be corrected by forming the positive lens (second lens 2) of the first lens group G1 of a material having a high refractive index.

The second lens group G2 may include four lenses. For example, the second lens group G2 may include a third lens 3 having a positive refractive power, a fourth lens 4 having a positive refractive power, a fifth lens 5 having a negative refractive power, and a sixth lens 6 having a positive refractive power and may include at least one aspherical surface and one or more cemented lenses. For example, the third lens 3, the fourth lens 4, and the fifth lens 5 may constitute a triple cemented lens. The triple cemented lens is included in the second lens group G2 so that the size of the lens holder is reduced, the zoom lens is miniaturized and deviation in assembling the lenses are reduced and optical performance is improved. In addition, an aspherical surface may be included on the side closest to the object side O of the second lens group G2. An aspherical surface is included in the second lens group G2 so that manufacturing costs of the zoom lens is reduced. In the current embodiment, the second lens group G2 may move perpendicularly to the optical axis, thereby correcting shake of an image plane due to hand shake during photographing.

The triple cemented lens corrects color aberration, and a spherical lens is disposed at the image side I of the triple cemented lens so that aberration can be easily controlled. In addition, an aperture stop ST is disposed at the image side I of the second lens group G2 so that the distance between the first lens group G1 and the second lens group G2 at the telephoto position can be reduced. In the current embodiment, optical distortion is corrected by digital correction, which results in correction of distortion that occurs due to super wide angle.

The third lens group G3 includes a seventh lens 7. The third lens group G3 may be composed of a single lens. A first filter 8 and a second filter 9 may be further disposed at the image side I of the second lens 7.

Meanwhile, the zoom lens according to the current embodiment may realize high magnification with super wide angle according to the following expression 3:

$$ft/fw > 4$$ (3)

where ft is the focal length at the telephoto position and fw is the focal length at the wide angle position.

According to the current embodiment, the triple cemented lens of the second lens group G2 is constituted to satisfy the following expression $$nC2max > 1.9$$ (4)

where nC2max is the maximum refractive index of a lens included in the triple cemented lens. In this way, the triple cemented lens is constituted by using a material having a high refractive index so that color aberration can be reduced. In addition, the triple cemented lens is constituted to satisfy the following expression $$vC2max > 80$$ (5)

where vC2max is the maximum Abbe number of the lens included in the triple cemented lens.

In the current embodiment, the distance between the first lens group G1 and the second lens group G2 at the telephoto position and at the wide angle position is reduced, and the amount of movement of the second lens group G2 is reduced during zooming, so that the zoom lens is miniaturized, in accordance with the following inequalities (6) and (7):

$$15 > Dt12 > 0.5 \text{ (mm)}$$ (6)

where Dt12 is the distance between the first lens group G1 and the second lens group G2 at the telephoto position. The distance between the first lens group G1 and the second lens group G2 is the distance from the lens surface closest to the image side I of the first lens group G1 to the lens surface closest to the object side O of the second lens group G2.

$$30 > Dw12 > 10 \text{ (mm)}$$ (7)

where Dw12 is the distance between the first lens group G1 and the second lens group G2 at the wide angle position. The amount of movement L2 of the second lens group G2 during variable power operation can be obtained by using inequality (8) below.

$$25 > L2 > 10 \text{ (mm)}$$ (8)

Meanwhile, the aspherical shape of the lens according to the present invention may have the following profile according to expression 9, when the optical axis is the x-axis and a direction perpendicular to the optical axis is the y-axis, wherein a proceeding direction of light is positive.

$$x = \frac{cy^2}{1+\sqrt{1-(K+1)c^2h^2}} + Ah^4 + Bh^6 + Ch^8 + Dh^{10} \quad (9)$$

where x is the distance from the vertex of the lens to the direction of the optical axis, y is the distance in a direction perpendicular to the optical axis, K is a conic constant, A, B, C, and D are aspherical surface coefficients, and c is an inverse number (1/R) of the radius of curvature at the vertex of the lens.

In the present invention, specifically, the super wide angle of the zoom lens is realized according to embodiments including various designs as below.

Hereinafter, f is a synthetic focal length of the whole lens system, Fno is an F-number, 2ω is a viewing angle, R is the radius of curvature, Dn is the thickness of the center of a lens or a distance between lenses, $n_d$ is a refractive index of a lens and $v_d$ is the Abbe number. Also, ST is an aperture stop, and D1, D2, and D3 are variable distances, and * is an aspherical surface.

<First Embodiment>

TABLE 1

| | Wide angle position | Middle position | Telephoto position | |
|---|---|---|---|---|
| F | 3.65 | 10.415 | 17.18 | |
| Fno | 2.83 | 4.64 | 5.99 | |
| 2ω | 93.70 | 41.054 | 12.841 | |

| Lens surface | R | Dn | nd | vd |
|---|---|---|---|---|
| obj | Infinity | | | |
| S1* | 450.000 | 1.000 | 1.81309 | 42.93 |
| S2* | 4.400 | 1.886 | | |
| S3* | 6.879 | 1.794 | 2.01000 | 21.45 |
| S4* | 10.500 | D1 | | |
| S5* | 4.463 | 1.023 | 1.92081 | 25.75 |
| S6 | 8.613 | 1.000 | 1.49700 | 81.61 |
| S7 | −142.600 | 0.600 | 1.83153 | 20.04 |
| S8 | 4.000 | 0.300 | | |
| S9 | 10.500 | 0.903 | 1.88300 | 40.80 |
| S10 | −14.006 | 0.250 | | |
| ST | infinity | D2 | | |
| S12 | 83.204 | 1.300 | 1.76247 | 51.34 |
| S13* | −13.011 | D3 | | |
| S14 | infinity | 0.300 | 1.51680 | 64.20 |
| S15 | infinity | 0.300 | | |
| S16 | infinity | 0.500 | 1.51680 | 64.20 |
| S17 | infinity | 4.163 | | |
| I | infinity | | | |

The following numerical chart indicates aspherical surface coefficients according to the current embodiment.

The following numerical chart indicates variable distances at the wide angle position, at the middle position, and at the telephoto position, respectively, according to the current embodiment.

| Variable distance | Wide angle position | Middle position | Telephoto position |
|---|---|---|---|
| D1 | 13.500 | 2.817 | 0.700 |
| D2 | 5.514 | 14.142 | 22.479 |
| D3 | 1.900 | 1.718 | 1.350 |

<Second Embodiment>

TABLE 2

| | Wide angle position | Middle position | Telephoto position | |
|---|---|---|---|---|
| F | 3.66 | 10.57 | 17.35 | |
| Fno | 2.84 | 4.65 | 6.0 | |
| 2ω | 93.64 | 40.50 | 25.32 | |

| Lens surface | R | Dn | nd | vd |
|---|---|---|---|---|
| obj | Infinity | | | |
| S1* | 359.100 | 1.000 | 1.80817 | 43.11 |
| S2* | 4.302 | 1.883 | | |
| S3* | 6.909 | 1.797 | 2.0030 | 21.45 |
| S4* | 10.500 | D1 | | |
| S5* | 4.505 | 1.032 | 1.92638 | 26.27 |
| S6 | 9.007 | 1.000 | 1.49161 | 82.59 |
| S7 | −187.017 | 0.600 | 1.83627 | 19.94 |
| S8 | 4.169 | 0.300 | | |
| S9 | 11.047 | 0.900 | 1.88300 | 40.80 |
| S10 | −13.016 | 0.250 | | |
| ST | infinity | D2 | | |
| S12 | 73.004 | 1.300 | 1.76061 | 51.58 |
| S13* | −13.208 | D3 | | |
| S14 | infinity | 0.300 | 1.51680 | 64.20 |
| S15 | infinity | 0.300 | | |
| S16 | infinity | 0.500 | 1.51680 | 64.20 |
| S17 | Infinity | | | |
| I | infinity | | | |

The following numerical chart indicates aspherical surface coefficients according to the current embodiment.

| Lens surface | K | A | B | C | D |
|---|---|---|---|---|---|
| S1 | −1.000000 | 3.884907e−004 | −1.084806e−005 | 1.473505e−007 | −1.244847e−009 |
| S2 | −0.879144 | 7.236980e−004 | −5.655036e−006 | 1.726472e−006 | −7.303600e−008 |
| S3 | 0.619797 | −5.829592e−004 | 1.265974e−006 | −2.435556e−007 | −4.061174e−010 |
| S4 | 3.786149 | −5.766289e−004 | −1.022557e−005 | | |
| S5 | −0.208766 | −9.583962e−005 | −3.113854e−005 | 5.413132e−006 | −3.834248e−007 |
| S13 | −26.665131 | −9.394433e−004 | 5.296003e−005 | −1.004354e−006 | |

| Lens surface | K | A | B | C | D |
|---|---|---|---|---|---|
| S1 | −1.000000 | 2.130165e−004 | −1.759002e−006 | −3.987298e−008 | 1.931386e−010 |
| S2 | −1.351329 | 1.262972e−003 | −7.561017e−006 | 1.932344e−006 | −7.547271e−008 |
| S3 | 0.641905 | −4.655184e−004 | −1.522761e−006 | −3.644594e−007 | 3.845991e−009 |
| S4 | 3.828103 | −4.534840e−004 | −1.388854e−005 | 0 | 0 |
| S5 | −0.206260 | −9.943924e−005 | −4.020724e−005 | 6.663547e−006 | −4.514438e−007 |
| S13 | −28.577124 | −9.240630e−004 | 5.305888e−005 | −1.029231e−006 | 0 |

The following numerical chart indicates variable distances at the wide angle position, at the middle position, and at the telephoto position, respectively, according to the current embodiment.

| Variable distance | Wide angle position | Middle position | Telephoto position |
|---|---|---|---|
| D1 | 13.500 | 2.816 | 0.700 |
| D2 | 5.533 | 14.204 | 22.489 |
| D3 | 1.900 | 1.700 | 1.350 |

<Third Embodiment>

TABLE 3

| | Wide angle position | Middle position | Telephoto position |
|---|---|---|---|
| F | 3.66 | 10.57 | 17.48 |
| Fno | 2.82 | 4.64 | 6.00 |
| 2ω | 93.70 | 40.5 | 25.15 |

| Lens surface | R | Dn | nd | Vd |
|---|---|---|---|---|
| obj | Infinity | | | |
| S1* | 472.022 | 1.000 | 1.81172 | 42.98 |
| S2* | 4.011 | 1.862 | | |
| S3* | 6.808 | 1.818 | 2.01700 | 21.45 |
| S4* | 10.067 | D1 | | |
| S5* | 4.058 | 1.033 | 1.92129 | 28.30 |
| S6 | 8.602 | 1.000 | 1.49700 | 81.61 |
| S7 | −154.004 | 0.600 | 1.83122 | 20.99 |
| S8 | 4.003 | 0.300 | | |
| S9 | 10.551 | 0.903 | 1.88300 | 40.80 |
| S10 | −14.150 | 0.250 | | |
| ST | infinity | D2 | | |
| S12 | infinity | 1.300 | 1.77843 | 49.43 |
| S13* | −11.193 | D3 | | |
| S14 | infinity | 0.300 | 1.51680 | 64.20 |
| S15 | infinity | 0.300 | — | |
| S16 | infinity | 0.500 | 1.51680 | 64.20 |
| S17 | Infinity | | | |
| I | infinity | | | |

The following numerical chart indicates aspherical surface coefficients according to the current embodiment.

| Lens surface | K | A | B | C | D |
|---|---|---|---|---|---|
| S1 | −1.000000 | 3.603049e−004 | −1.033876e−005 | 1.525205e−007 | −1.338642e−009 |
| S2 | −0.875319 | 6.913415e−004 | 4.725903e−007 | 1.581523e−006 | −7.354656e−008 |
| S3 | 0.614529 | −5.023306e−004 | 1.301290e−006 | −2.784681e−008 | −7.460624e−009 |
| S4 | 3.727504 | −5.009157e−004 | −7.410859e−006 | | |
| S5 | −0.213573 | −1.117595e−004 | −2.720171e−005 | 4.970339e−006 | −3.729875e−007 |
| S13 | −4.079879 | 1.363118e−004 | 5.661458e−006 | −1.575188e−007 | |

The following numerical chart indicates variable distances at the wide angle position, at the middle position, and at the telephoto position, respectively, according to the current embodiment.

| Variable distance | Wide angle position | Middle position | Telephoto position |
|---|---|---|---|
| D1 | 13.500 | 2.879 | 0.700 |
| D2 | 5.496 | 14.149 | 22.466 |
| D3 | 1.900 | 1.700 | 1.350 |

<Fourth Embodiment>

TABLE 4

| | Wide angle position | Middle position | Telephoto position |
|---|---|---|---|
| f | 3.66 | 10.64 | 17.67 |
| Fno | 2.80 | 4.58 | 5.98 |
| 2ω | 93.7 | 40.24 | 25.24 |

| Lens surface | R | Dn | nd | vd |
|---|---|---|---|---|
| obj | Infinity | | | |
| S1* | 176.006 | 1.000 | 1.80825 | 43.10 |
| S2* | 4.300 | 1.787 | | |
| S3* | 6.043 | 1.893 | 2.00000 | 21.45 |
| S4* | 10.161 | D1 | | |
| S5* | 4.451 | 1.027 | 1.92286 | 27.91 |
| S6 | 8.006 | 1.000 | 1.49700 | 81.61 |
| S7 | −190.366 | 0.600 | 1.83014 | 20.60 |
| S8 | 4.100 | 0.300 | | |
| S9 | 11.361 | 0.900 | 1.88300 | 40.80 |
| S10 | −13.320 | 0.250 | | |
| ST | infinity | D2 | | |
| S12 | −127.299 | 1.300 | 1.84268 | 43.51 |
| S13* | −10.932 | D3 | | |
| S14 | infinity | 0.300 | 1.51680 | 64.20 |
| S15 | infinity | 0.300 | | |
| S16 | infinity | 0.500 | 1.51680 | 64.20 |
| S17 | infinity | | | |
| I | infinity | | | |

The following numerical chart indicates aspherical surface coefficients according to the current embodiment.

| Lens surface | K | A | B | C | D |
|---|---|---|---|---|---|
| S1 | −1.000000 | 2.795711e−004 | −9.899252e−006 | 1.620796e−007 | −1.373033e−009 |
| S2 | −0.876449 | 7.312803e−004 | −4.818678e−006 | 1.137317e−006 | −5.671850e−008 |
| S3 | 0.564119 | −4.270774e−004 | −2.906938e−006 | 3.962646e−007 | −1.651774e−008 |
| S4 | 3.572552 | −5.323397e−004 | −2.415497e−007 | | |
| S5 | −0.224962 | −1.432080e−004 | −2.324327e−005 | 4.413561e−006 | −3.204780e−007 |
| S13 | −1.526220 | 3.153351e−004 | 4.157865e−006 | −1.784859e−007 | |

The following numerical chart indicates variable distances at the wide angle position, at the middle position, and at the telephoto position, respectively, according to the current embodiment.

| Variable distance | Wide angle position | Middle position | Telephoto position |
|---|---|---|---|
| D1 | 13.500 | 2.871 | 0.700 |
| D2 | 5.453 | 14.099 | 22.443 |
| D3 | 1.900 | 1.700 | 1.350 |

<Fifth Embodiment>

TABLE 5

| | Wide angle position | Middle position | Telephoto position |
|---|---|---|---|
| f | 3.65 | 10.75 | 18.62 |
| Fno | 2.77 | 4.51 | 5.98 |
| 2ω | 93.6 | 39.876 | 24.51 |

| Lens surface | R | Dn | nd | vd |
|---|---|---|---|---|
| obj | Infinity | | | |
| S1* | 154.929 | 1.043 | 1.80437 | 43.24 |
| S2* | 4.335 | 1.661 | | |
| S3* | 6.624 | 1.977 | 1.98900 | 21.45 |
| S4* | 9.957 | D1 | | |
| S5* | 4.507 | 1.035 | 1.92499 | 27.98 |
| S6 | 8.842 | 1.000 | 1.49700 | 81.61 |
| S7 | −168.832 | 0.600 | 1.82805 | 20.45 |
| S8 | 4.178 | 0.300 | | |
| S9 | 12.063 | 0.900 | 1.88300 | 40.80 |
| S10 | −12.660 | 0.250 | | |
| ST | infinity | D2 | | |
| S12 | −42.655 | 1.370 | 1.88300 | 40.80 |
| S13* | −9.515 | D3 | | |
| S14 | infinity | 0.300 | 1.51680 | 64.20 |
| S15 | infinity | 0.300 | | |
| S16 | infinity | 0.500 | 1.51680 | 64.20 |
| S17 | Infinity | | | |
| I | | infinity | | |

The following numerical chart indicates aspherical surface coefficients according to the current embodiment.

| Lens surface | K | A | B | C | D |
|---|---|---|---|---|---|
| S1 | −1.000000 | 2.995911e−004 | −1.076161e−005 | 1.580882e−007 | −1.207959e−009 |
| S2 | −0.828924 | 7.869812e−004 | −5.373641e−006 | 5.967113e−007 | −4.422061e−008 |
| S3 | 0.486879 | −4.371073e−004 | −6.436678e−006 | 5.457895e−007 | −1.802381e−008 |
| S4 | 3.387381 | −6.426594e−004 | 7.140804e−007 | | |
| S5 | −0.229310 | −1.480877e−004 | −2.877910e−005 | 5.349438e−006 | −3.634378e−007 |
| S13 | −1.327635 | 3.524901e−004 | 2.664861e−006 | −1.552963e−007 | |

The following numerical chart indicates variable distances at the wide angle position, at the middle position, and at the telephoto position, respectively, according to the current embodiment.

| Variable distance | Wide angle position | Middle position | Telephoto position |
|---|---|---|---|
| D1 | 13.500 | 2.872 | 0.700 |
| D2 | 5.330 | 14.021 | 22.407 |
| D3 | 1.900 | 1.700 | 1.350 |

The following Table 6 shows that the first through fifth embodiments satisfy the expressions 1 through 8.

TABLE 6

| | First embodiment | Second embodiment | Third embodiment | Fourth embodiment | Fifth embodiment |
|---|---|---|---|---|---|
| Expression 1 | 93.70 | 93.64 | 93.70 | 93.70 | 93.60 |
| Expression 2 | 2.01 | 2.003 | 2.017 | 2.000 | 1.989 |
| Expression 3 | 4.7 | 4.74 | 4.78 | 4.83 | 5.01 |
| Expression 4 | 1.92081 | 1.92638 | 1.92129 | 1.92286 | 1.92499 |
| Expression 5 | 81.61 | 82.59 | 81.61 | 81.61 | 81.61 |
| Expression 6 | 0.7 | 0.7 | 0.7 | 0.7 | 0.7 |
| Expression 7 | 13.5 | 13.5 | 13.5 | 13.5 | 13.5 |
| Expression 8 | 16.5 | 16.5 | 16.5 | 16.5 | 16.5 |

As described above, the zoom lens system according to the present invention has a high zoom, the super-wide angle at the wide angle position is obtained and miniaturization is realized. In this way, a super wide angle is realized so that a subject can be photographed at a wider angle. The zoom lens according to the above embodiments can be suitable for use in digital still cameras or video cameras using an image sensor, such as a charge coupled device (CCD) or complementary metal oxide semiconductor (CMOS), or mobile phones.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A wide angle zoom lens comprising:
a first lens group having a negative refractive power;
a second lens group having a positive refractive power; and
a third lens group having a positive refractive power,
wherein the first lens group, the second lens group, and the third lens group are arranged in an order from an object side to an image side, and
wherein, during zooming from the wide angle position to the telephoto position, the distance between the first lens group and the second lens group is reduced, and the second lens group is moved toward the object side, and the distance between the second lens group and the third lens group is increased, and wherein the second lens group comprises four lenses having respectively positive, positive, negative and positive refractive power, and the wide angle zoom lens satisfies the following expression:

$$86°≦wfov≦110°$$

where wfov is the viewing angle at the wide angle position.

2. The wide angle zoom lens of claim 1, wherein the zoom lens satisfies the following expression:

$$ft/fw > 4$$

where ft is the focal length at the telephoto position and fw is the focal length at the wide angle position.

3. The wide angle zoom lens of claim 1, wherein the first lens group comprises at least one positive lens and satisfies the following expression:

$$nG2 > 1.9$$

where nG2 is the refractive index of the positive lens disposed closest to the image side of the first lens group.

4. The wide angle zoom lens of claim 1, wherein the third lens group performs focusing.

5. The wide angle zoom lens of claim 1, wherein the third lens group comprises a single lens.

6. The wide angle zoom lens of claim 1, wherein the zoom lens satisfies the following expression at the telephoto position $$15 > Dt12 > 0.5 \text{ (mm)}$$

where Dt12 is the distance between the first lens group and the second lens group at the telephoto position.

7. The wide angle zoom lens of claim 1, wherein the zoom lens satisfies the following expression at the wide angle position $$30 > Dw12 > 10 \text{ (mm)}$$

where Dw12 is the distance between the first lens group and the second lens group at the wide angle position.

8. The wide angle zoom lens of claim 1, wherein the zoom lens satisfies the following expression $$25 > L2 > 10 \text{ (mm)}$$

where L2 is the maximum distance the second lens group moves.

9. The wide angle zoom lens of claim 1, wherein an aperture stop is disposed closest to the image side of the second lens group.

10. The wide angle zoom lens of claim 1, wherein the second lens group comprises a triple cemented lens.

11. The wide angle zoom lens of claim 10, wherein the triple cemented lens satisfies the following expression $$nC2max > 1.9$$

where nC2 max is the maximum refractive index of a lens included in the triple cemented lens.

12. The wide angle zoom lens of claim 10, wherein the triple cemented lens satisfies the following expression $$vC2max > 80$$

where vC2 max is the maximum Abbe number of the lens included in the triple cemented lens.

13. A wide angle zoom lens comprising:
a first lens group having a negative refractive power;
a second lens group having a positive refractive power; and
a third lens group having a positive refractive power,
wherein:
the first lens group, the second lens group, and the third lens group are arranged in an order from an object side to an image side;
during zooming from the wide angle position to a telephoto position:
the distance between the first lens group and the second lens group is reduced;
the second lens group is moved toward the object side; and
the distance between the second lens group and the third lens group is increased;
the first lens group comprises two lenses, and
the wide angle zoom lens satisfies the following expressions:

$$86°≦wfov≦110°$$

where wfov is the view angle at the wide angle position; and $$ft/fw > 4$$

where ft is the focal length at the telephoto position and fw is the focal length at the wide angle position.

14. The wide angle zoom lens of claim 13, wherein the first lens group comprises at least one positive lens and satisfies the following expression:

$$nG2 > 1.9$$

where nG2 is the refractive index of the positive lens disposed closest to the image side of the first lens group.

15. The wide angle zoom lens of claim 13, wherein the third lens group performs focusing.

16. The wide angle zoom lens of claim 13, wherein the zoom lens satisfies the following expression at the telephoto position $$15 > Dt12 > 0.5 \text{ (mm)}$$

where Dt12 is the distance between the first lens group and the second lens group at the telephoto position.

17. The wide angle zoom lens of claim 13, wherein the zoom lens satisfies the following expression at the wide angle position $$30 > Dw12 > 10 \text{ (mm)}$$

where Dw12 is the distance between the first lens group and the second lens group at the wide angle position.

18. A wide angle zoom lens comprising:
a first lens group having a negative refractive power;
a second lens group having a positive refractive power; and
a third lens group having a positive refractive power,
wherein:
the first lens group, the second lens group, and the third lens group are arranged in an order from an object side to an image side;
during zooming from the wide angle position to a telephoto position:
the distance between the first lens group and the second lens group is reduced;
the second lens group is moved toward the object side; and the distance between the second lens group and the third lens group is increased;
the first lens group comprises two lenses;
the wide angle zoom lens satisfies the following expression:

$$86°\leq wfov \leq 110°$$

where wfov is the view angle at the wide angle position; and
the second lens group comprises a triple cemented lens.

19. The wide angle zoom lens of claim 18, wherein the triple cemented lens satisfies the following expression $$nC2max > 1.9$$

where nC2max is the maximum refractive index of a lens included in the triple cemented lens.

20. The wide angle zoom lens of claim 18, wherein the triple cemented lens satisfies the following expression $$vC2max > 80$$

where vC2max is the maximum Abbe number of the lens included in the triple cemented lens.

21. A wide angle zoom lens comprising:
a first lens group having a negative refractive power;
a second lens group having a positive refractive power; and
a third lens group having a positive refractive power,
wherein:
the first lens group, the second lens group, and the third lens group are arranged in an order from an object side to an image side;
during zooming from the wide angle position to a telephoto position:
the distance between the first lens group and the second lens group is reduced;
the second lens group is moved toward the object side; and
the distance between the second lens group and the third lens group is increased;
the first lens group comprises two lenses;
the wide angle zoom lens satisfies the following expressions:

$$86°\leq wfov \leq 110°$$

where wfov is the view angle at the wide angle position; and $$25 > L2 > 10 \text{ (mm)}$$

where L2 is the distance the second lens group moves.

* * * * *